(12) United States Patent
Daccord et al.

(10) Patent No.: US 7,398,828 B2
(45) Date of Patent: *Jul. 15, 2008

(54) WELL CEMENTING SLURRIES CONTAINING FIBERS

(75) Inventors: Gérard Daccord, Vauhallan (FR); Jean-Philippe Bedel, Noisy le Grand (FR); Michel Ermel, St Lambert des Bois (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/836,356

(22) Filed: Aug. 9, 2007

(65) Prior Publication Data

US 2008/0026961 A1    Jan. 31, 2008

(51) Int. Cl.
  *E21B 33/13*   (2006.01)
  *C04B 14/48*   (2006.01)
  *C04B 24/00*   (2006.01)

(52) U.S. Cl. .................. 166/293; 106/644; 106/724

(58) Field of Classification Search ............... None
See application file for complete search history.

(56) References Cited

U.S. PATENT DOCUMENTS

| 3,844,351 | A | * | 10/1974 | Sutton et al. ............. 166/293 |
| 4,871,395 | A |   | 10/1989 | Sugama |
| 6,197,106 | B1 | * | 3/2001 | Tieckelmann et al. ....... 106/644 |
| 6,308,777 | B2 |   | 10/2001 | Chatterji et al. |
| 6,458,198 | B1 |   | 10/2002 | Baret et al. |
| 7,178,597 | B2 |   | 2/2007 | Reddy et al. |

FOREIGN PATENT DOCUMENTS

WO    03014040    2/2003

* cited by examiner

*Primary Examiner*—Zakiya W. Bates
*Assistant Examiner*—Angela M DiTrani
(74) *Attorney, Agent, or Firm*—Dave Cate; Robin Nara; Dale Gaudier

(57) ABSTRACT

The problem of fiber or particle settling in well cement slurries is addressed by providing a fluid containing two fiber components of differing properties. Such a well treatment fluid, comprising a base fluid; a first fiber component that it substantially more dense than the base fluid; and a second fiber component that has a density close to that of the base fluid and is relatively flexible.

6 Claims, 4 Drawing Sheets

WELL CEMENTING SLURRIES CONTAINING FIBERS

BACKGROUND OF THE INVENTION

1. Field of the Invention

The present invention relates to cementing slurries containing particles and fibres. In particular, it relates to such fluids in which the sedimentation of the particles or fibres in the slurry is prevented or hindered. Such slurries find applications in well cementing operations.

2. Description of Related Art

The use of particles or fibres in well treatment fluids such as cements has been previously proposed. One such example is described in European Patent No. 1086057 which describes the use of amorphous cast-iron platelet particles in oil-well cements to provide added toughness and impact resistance. However, there is a large density difference between the particle and the base fluid—the cement slurry with which the particles are mixed—so special care must be taken to prevent the sedimentation of the particles. When the particles are metallic, for instance based on cast iron, the density difference is commonly around 5000 kg/m$^3$. Preventing the sedimentation of these fibres is usually ensured by viscosifying the base fluid. The rheology of the base fluid is characterized by a minimum of two parameters, the high shear rate viscosity and the yield stress, which quantifies the low shear rate viscosity of the fluid. There are many drawbacks to viscosifying the base fluid, for instance increase friction pressure drops when the fluid is pumped through tubulars, difficulties in mixing it and increased cost due to the use of viscosifying agents.

EP 621 247 describes the use of selected particle size distributions for solid materials used in cementing slurries to provide slurries that are stable against settling or sedimentation.

EP 721 050 and U.S. Pat. No. 5,501,275 both describe fluids containing a base fluid, a first fibre or particle component and a second fibre component, and relate to the use of fibres in the fluid to limit the movement of particulate materials in the fluid such as sand or proppant particles

SUMMARY OF THE INVENTION

It is an object of the invention to provide a fibre-containing well treatment fluid suitable for use in well cementing operations in which the settling of particles or fibres is inhibited.

In accordance with the present invention, there is provided a slurry comprising a base fluid, first component comprising a fibrous or particulate material and a second component comprising a fibrous material, characterised in that the base fluid comprises a cement slurry, the first component is substantially more dense than the base fluid, and the second component has a density close to that of the base fluid and is relatively flexible.

The present invention addresses the problem of settling of the first component by providing a fluid containing a second fibre component with differing properties which can form a network in the base fluid which traps the first fibre component and prevents or hinders settling.

The first fibre component is typically a metallic material, such as amorphous cast iron, which can be present in the form of platelet-like structures having an average length that is less than 10 mm. Such a fibre is relatively short, dense and rigid.

The second fibre component is typically a glass, carbon or polymeric material in the form of long, flexible fibres or ribbons. Such materials typically have a density close to that of the base fluid (cement) and an average fibre length in the range 5-35 mm. The fibres of the second component are preferably at least as long as, and thinner than, those of the first component.

The second fibre component is typically present in an amount of less than 10% by mass of the total amount of fibre in the fluid.

The cement slurry forming the base fluid can be any form of cement slurry that is suitable for well cementing operations, in particular a shear thinning slurry.

By adopting the approach of this invention, it is possible to maintain the fibres in suspension without the need to increase the viscosity of the fluid with the inherent operational problems that can be caused thereby.

BRIEF DESCRIPTION OF THE DRAWINGS

The present invention will now be described by way of examples and with reference to the accompanying drawings, in which.

DETAILED DESCRIPTION OF THE INVENTION

Figure 1:
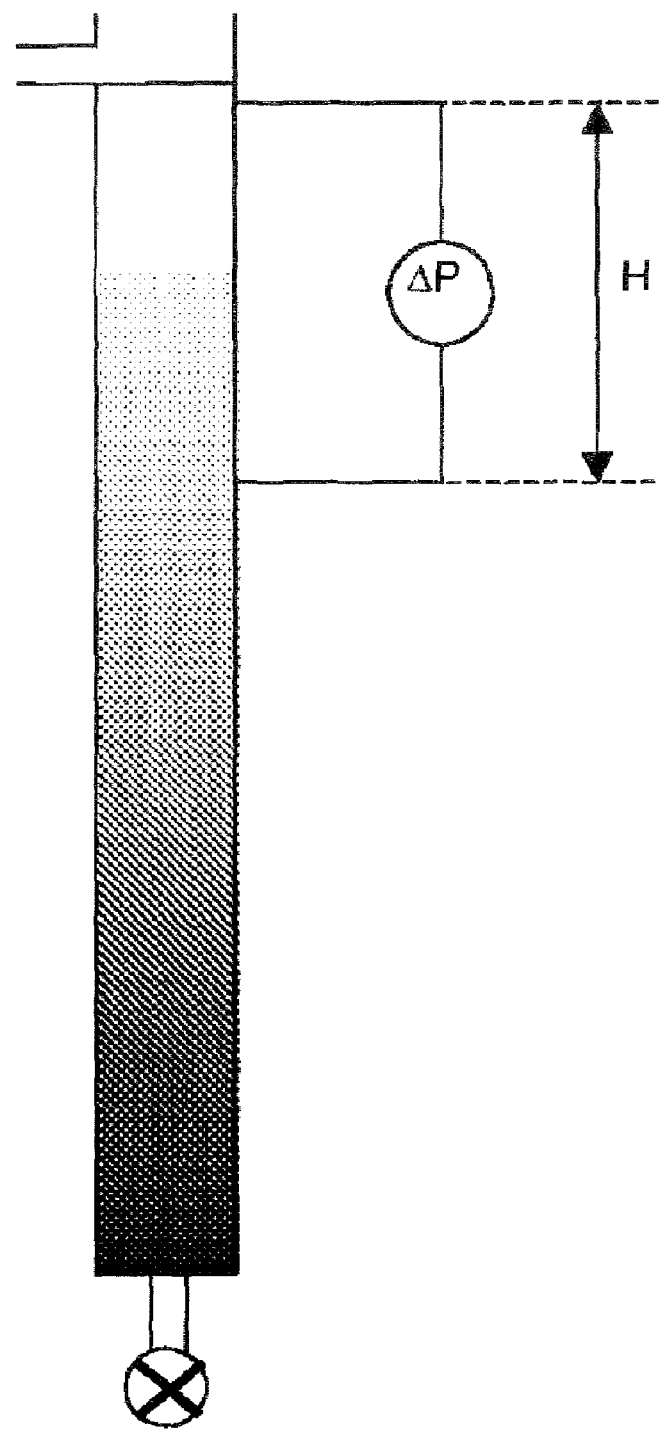
FIG. 1 shows the experimental apparatus.

The present invention can be demonstrated by sedimentation experiments performed in a vertical tube T, with a diameter of 5 cm and a length of 80 cm. The fibre concentration is determined by monitoring the pressure gradient using a Validyne differential pressure gauges $\Delta P1$, as shown on FIG. 1. The differential pressure gauges $\Delta P1$, is calibrated using a column of water. All measurements are expressed in terms of density, by converting the pressure records according to the following calibration data.

| Transducer | $\Delta P1$ | $\Delta P2$ | $\Delta P3$ |
|---|---|---|---|
| Membrane nb and range | 30-86 mbar (1.25 psi) | 26-35 mbar (0.5 psi) | 22-14 mbar (0.2 psi) |
| Sensitivity/calibration slope | 2.0 V/mbar | 3.76 V/mbar | 3.69 V/mbar |

$$\Delta \rho_i = \Delta P_i / g \Delta H_i \quad \text{Eq. 1}$$

The experimental procedure comprises the following steps:

The sedimentation tube is filled with water and all tubes purged of air bubbles. The equilibrium transducer output is recorded to be used as baseline.

The experimental base fluid is mixed: 12 g of biozan (a biopolymer) are added to 3 L of water and the solution is stirred for 40 min to allow full hydration of the polymer, using a paddle mixer. Antifoam and biocide are added. This base fluid is chosen for its rheology and essentially inert behaviour towards the fibres used in the experiments while corresponding closely to the behaviour of cementing fluids without setting in the manner of a cement.

The base fluid is tested to determine its rheology.

The dense fibres (SG Seva Fibraflex FF5E0 "Fibraflex") are added to the base fluid. When flexible fibres are used, 500 mL of base fluid are poured in a Waring blender. The flexible fibres are dispersed by rotating at low speed. The rotation speed is adjusted in order to keep the vortex. The suspension is then poured back in the main container where Fibraflex fibres are added.

In the experiments, the suspension is either poured into the sedimentation tube or is pumped using a peristaltic pump to fill the tube from the bottom.

The pressure gradients are recorded on paper for a period of time ranging from 1 hour to overnight. The pressure decay is fitted with an exponential function allowing determination of the time constant.

Measurements are interpreted in terms of excess density with respect to the base fluid. Knowing the density and concentration of FIBRAFLEX fibres (100 g/L), the theoretical density of the homogeneous suspension is 1086 g/L. The excess density is therefore about 86 g/L.

The rheology of five batches of base fluid is monitored using a Fann 35, R1B1F1, to assess its reproducibility. The corresponding data and plot are shown below (Table 1). The rheology of the polymer solution is stable for more than one day.

TABLE 1

|  | Sample | | | | |
| --- | --- | --- | --- | --- | --- |
|  | A | B | C | D | E |
| 300/200/100/60/30/6/3 RPM | 25/21/17/15/ 12/8/7 | 27/23/19/17/ 13/9/8 | 27/22/18/15/ 13/9/8 | 27/23/19/17/ 14/10/9 | 26/22/18/15/ 13/9/8 |
| Gel: 10 min/1 s/stir readings | 12/9/8 | 14/10/9 | 12/9/8 | 12/10/9 | — |
| HB parameters: $K\ (Pa \cdot s^{-n})/n/T_0(Pa)$ | 0.67/0.437/ 1.94 | 0.97/0.392/ 2.0 | 0.346/0.54/ 3.1 | 0.82/0.401/ 3.05 | 0.583/0.45/ 2.94 |
| Bingham parameters PV (cP)/YP (Pa) | 13.3/5.8 | 12.4/7.03 | 15.3/5.75 | 13.3/6.75 | 14.3/5.85 |

Six different flexible fibres (Samples 1-6) are studied. Their properties are gathered in Table 2 below.

Sample 1: short polyamide (nylon 6-6) fibres.
Sample 2: long polyamide fibres.
Sample 3: polypropylene ribbons, with a broad length distribution.
Sample 4: glass fibres with 40% water.
Sample 5: novoloid fibres with 20% water.
Sample 6: PET fibre. Its formulation includes a dispersant to enhance its dispersability in water. When the fibres are cleaned with an organic solvent, they become very difficult to disperse in water.

TABLE 2

|  | Sample | | | | | | |
| --- | --- | --- | --- | --- | --- | --- | --- |
|  | FIBRAFLEX | 1 | 2 | 5 | 3 | 4 | 6 |
| Material | Cast iron | polyamide | polyamide | novoloid | polypropylene | fiberglass | Polyester |
| Shape | platelets | rods | rods | rods | platelets | rods | rods |
| Length | 5 mm | 12 mm | 19 mm | 20 mm | 12-35 mm | 12 mm | 6 mm |
| Diameter or width | 0.8 mm wide | 18 μm | 18 μm | 21 μm | 0.8 mm wide | 20 μm | ~10 μm |

The following suspension compositions are analysed, where the concentrations are defined per liter of water.

TABLE 3

| Reference and placement method | Base fluid | Fibres | Sedimentation time (minutes), mean fluctuation (%) |
| --- | --- | --- | --- |
| A1 Poured from top | Biozan 4 g/L Antifoam 1 g/L | Fibraflex 100 g/L Sample 2 2 g/L | 154 (0.31%) |
| A2 Poured from top | Biozan 4 g/L Antifoam 1 g/L Biocide 1 g/L | Fibraflex 100 g/L | 4 (1.2%) 60 |
| A3 Poured from top | Biozan 4 g/L Antifoam 1 g/L Biocide 1 g/L | Fibraflex 100 g/L Sample 1 2 g/L | 101 (0.35%) |
| A4 Poured from top | Biozan 4 g/L Antifoam 1 g/L Biocide 1 g/L | Fibraflex 100 g/L Sample 1: 3 g/L | 134 (0.35%) 65 |

TABLE 3-continued

| Reference and placement method | Base fluid | Fibres | Sedimentation time (minutes), mean fluctuation (%) |
|---|---|---|---|
| A5 Pumped from bottom | Biozan 4 g/L Antifoam 1 g/L Biocide 1 g/L | Fibraflex 100 g/L Sample 1: 4 g/L | 544 (0.18%) |
| A6 Pumped from bottom | Biozan 4 g/L Antifoam 1 g/L Biocide 1 g/L | Fibraflex 100 g/L Sample 1: 1 g/L | 52 (0.38%) |
| A7 Pumped from bottom | Biozan 4 g/L Antifoam 1 g/L Biocide 1 g/L | Fibraflex 100 g/L Sample 5: 2 g/L | 571 (0.34%) |
| A8 Pumped from bottom | Biozan 4 g/L Antifoam 1 g/L Biocide 1 g/L | Fibraflex 100 g/L Sample 4: 2 g/L | 65 (0.21%) |
| A9 Pumped from bottom | Biozan 4 g/L Antifoam 1 g/L Biocide 1 g/L | Fibraflex 100 g/L Sample 3: 2 g/L | 47 (0.62%) |
| A10 Pumped from bottom | Biozan 4 g/L Antifoam 1 g/L Biocide 1 g/L | Fibraflex 100 g/L Sample 5: 1 g/L | 100 (0.13%) |
| A11 Pumped from bottom | Biozan 4 g/L Antifoam 1 g/L Biocide 1 g/L | Fibraflex 100 g/L Sample 6: 2 g/L | 2100 (0.11%) |
| A12 Pumped from bottom | Biozan 4 g/L Antifoam 1 g/L Biocide 1 g/L | Fibraflex 100 g/L Sample 6: 1 g/L | 283 (0.15%) |

A first general observation is that the initial excess density (FIG. 2) is in quite good agreement with the theoretical value of 86 g/L. Another general observation is that large pressure fluctuations are observed for all experiments, starting at the beginning and lasting until no more FIBRAFLEX fibres are left in suspension in between the pressure ports of the transducer. From visual observations, two phenomena may explain these observations:

The FIBRAFLEX fibres tend to settle as large aggregates.

In a few cases, convection cells are clearly observed especially when the settling velocity is fast.

A measure of the amplitude of these fluctuations is provided (Table 3) as the mean square difference between the measurements and the exponential fit.

Figure 2:
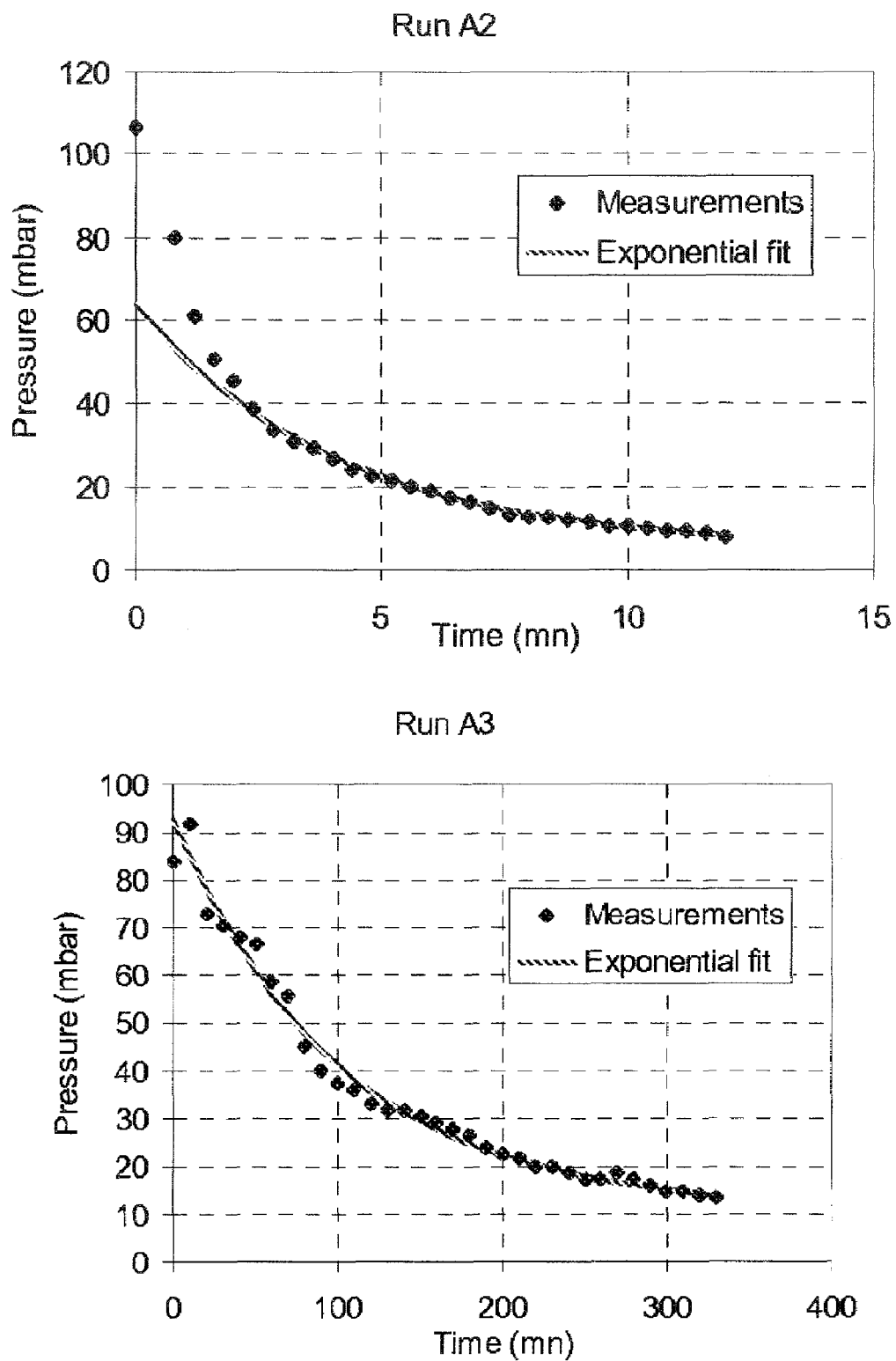
FIG. 2 show plots of pressure vs. time for runs A2 and A3.

Results for runs A2 and A3 are shown in FIG. 2 and are typical.

Figure 3A:
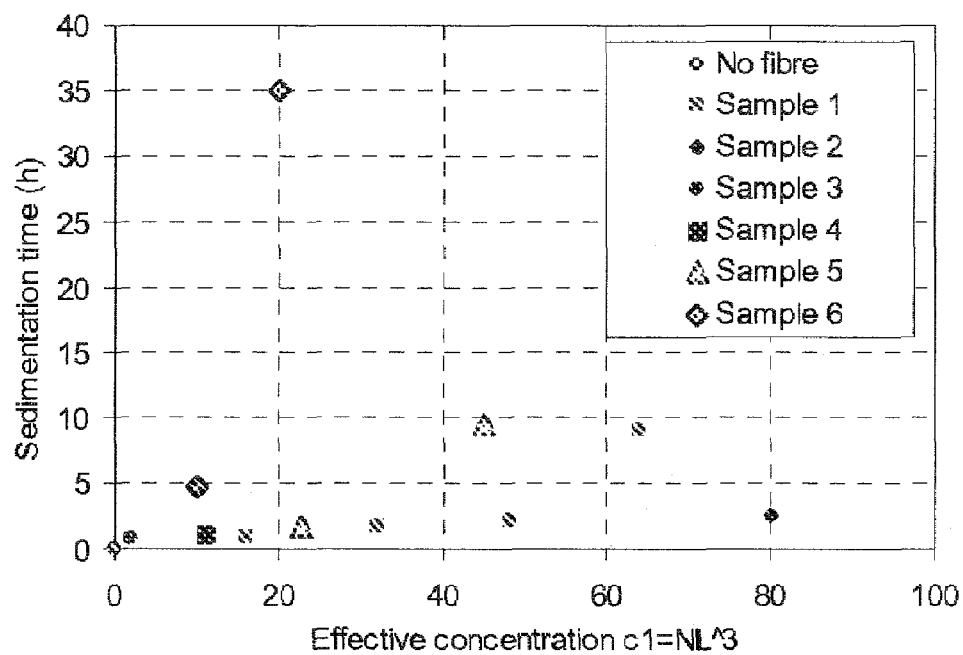
FIGS. 3a and 3b show plots of sedimentation time vs. effective concentrations C1 and C2 respectively.
Figure 3B:
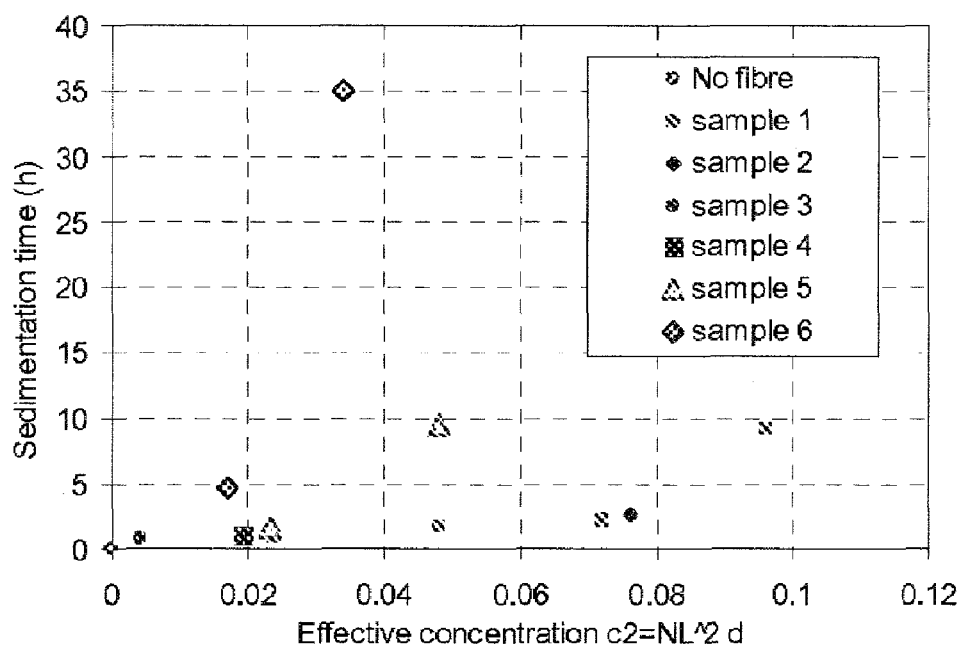

The sedimentation times are plotted versus the concentration of flexible fibres on FIGS. 3a and 3b. Logically, the sedimentation time increases—faster than linearly—when the concentration of flexible fibres increases. Also, the more dispersed the fibres are, the strongest the effect: Sample 6 are dispersed in individual fibres, Sample 5 are slightly more difficult to disperse while the polyamide and polypropylene fibres are clearly hydrophobic and remain stuck together. In summary, the experimental data fall in three groups:

Very large effect, Sample 6;

Average effect: Sample 5, Sample 4, Sample 2, Sample 1;

Small effect: Sample 3.

In dilute suspensions, the relevant parameters that characterize the settling of fibres are their hydrodynamic size and their effective concentration calculated based on this size. If N is the number of fibres per unit volume and L their length and d the fibre diameter, the relevant dimensionless numbers are:

$$c_1 = N(L/2)^3$$

$$c_2 = N(L/2)^2(d/2)$$

$$c_3 = 2\pi N(L/2)(d/2)^2$$

Eq. 2

$c_1$ represents the hydrodynamic volume, in dilute conditions. $c_2$ is the volume of the disks whose diameter is equal to the fibre length: it is considered to be the relevant parameter in semi-dilute regime. $c_3$ is the material concentration.

For $c_1 < 1$, the regime is dilute; if $c_1 > 1 > c_2$ this is a semi-dilute regime and the suspension is considered to be concentrated when $c_2 > 1$. Table 4 provides these effective concentrations, based on a concentration of flexible fibres of 2 g/L.

TABLE 4

| | Rods | | | | | Ribbons | |
|---|---|---|---|---|---|---|---|
| | Sample 4 | Sample 5 | Sample 2 | Sample 1 | Sample 6 | Sample 3 | Fibraflex |
| Cylinder diam./Width (μm) | 20 | 21 | 18 | 18 | 10 | 800 | 1000 |
| Thickness (μm) | — | — | — | — | — | 23 | 25 |
| Length (mm) | 12 | 20 | 19 | 12 | 6 | 12 to 35 | 5 |
| Density (kg/L) | 2.5 | 1.27 | 1.1 | 1.1 | 1.37 | 0.9 | 7.2 |
| Concentration (g/L) | 2 | 2 | 2 | 2 | 2 | 2 | 100 |
| Nb/volume (m$^{-3}$) | 5.31E+07 | 5.68E+07 | 9.40E+07 | 1.49E+08 | 7.44E+08 | 1.01E+07 | 1.11E+08 |
| Material conc., $c_3$ (vol %) | 0.08% | 0.16% | 0.18% | 0.18% | 0.15% | 0.22% | 1.39% |
| Effective conc. $c_1/c_2$ | 11/0.02 | 56/0.06 | 80/0.08 | 32/0.05 | 20/0.03 | 2/0.15 | 2/0.3 |

Clearly, the suspensions must be considered to be in the semi-dilute regime.

Figure 4A:
FIGS. 4a and 4b show photographs of sediment cake with Samples 1 and 5 respectively.
Figure 4B:

The fact that the fibres are intimately interpenetrating ($c_1 \gg 1$) explains the suspension properties: they form a kind of a gel that physically hinders the settling of the heavy FIBRAFLEX particles. It is possible to make sure that, when the FIBRAFLEX particles settle, they do so through the network of flexible fibres. The clear supernatant liquid at the top of the column still contains flexible fibres and the sediment deposited at the bottom of the tube contains a mixture of both fibres, clearly visible in FIGS. 4a and 4b. When flexible fibres are present, the cake of FIBRAFLEX particles is much less compact to a point that sometimes it can be put back in flow with no external mixing.

Using its hydrodynamic volume and Stokes law, the settling velocity of a single FIBRAFLEX particle would be around 0.5 mm/s, considering an effective solution viscosity of 0.5 Pa·s (at 10 $s^{-1}$). This value is in agreement with the mean settling velocity of experiment A2 (no flexible fibres used), v~20 cm/4 mn=0.8 mm/s.

The exponential behaviour of all measured data corresponds to a sedimentation regime governed by interactions between sedimenting particles: for non-interacting particles, a linear behaviour should be observed corresponding to the downward displacement of the upper front. This observation re-enforce the fact that the fibre suspension is in a semi-dilute regime.

The density fluctuations observed in almost all experiments may originate from the difficulty in preparing homogeneous fibres suspensions, especially when the fibres are hydrophobic (Samples 2 and 3). Also, the significant length of the fibres can lead to wrapping around any rotating instrument, possibly resulting in kind of "balls of yarn". There is some correlation between the amplitude of these fluctuations and the nature of the fibres: the amplitude decreases for large fibre concentration and hydrophilically treated materials (Samples 4 and 5).

In practical applications, the two fibre components are added to the other components of the cement slurry in the usual manner. The precise amounts of fibres to be added can be determined by simple experimentation according to the required performance of the slurry. Once mixed, the slurry including the fibres is pumped into the well in the normal manner.

The invention claimed is:

1. A method of cementing in a well, comprising:
providing a cement composition comprising water, cement, a first fibrous component made of metallic fibres and a second fibrous component made of glass, carbon or polymeric fibres having a density close to that of the cement, said second fibrous component present at a concentration of less than 10% by mass of the total fibrous content of the cement composition;
introducing the cement composition into the well; and
allowing the cement composition to set therein.

2. The method of claim 1, wherein the metallic fibres have an average length less than 10 millimeters and an average diameter taken of 800 or 1000 microns.

3. The method of claim 2, wherein the metallic fibres have a mean aspect ratio of less than 12.5.

4. The method of claim 2, wherein the metallic fibres have a mean aspect ratio of 10 or 12.5.

5. The method of claim 1, wherein the metallic fibres comprise amorphous cast iron.

6. The method of claim 1, wherein the second fibrous component has a length ranging from 5 to 35 millimeters.

* * * * *